J. A. JONES.
Spring-Bed Bottom.

No. 159,930. Patented Feb. 16, 1875.

Witnesses:
G. B. Towles.
R. P. Lowe.

Inventor:
Jesse A. Jones
By W. Burris
Atty.

UNITED STATES PATENT OFFICE.

JESSE A. JONES, OF RALEIGH, NORTH CAROLINA.

IMPROVEMENT IN SPRING BED-BOTTOMS.

Specification forming part of Letters Patent No. 159,930, dated February 16, 1875; application filed June 27, 1874.

*To all whom it may concern:*

Be it known that I, JESSE A. JONES, of Raleigh, in the county of Wake and State of North Carolina, have invented certain new and useful Improvements in Spring Bed-Bottoms; and I do hereby declare that the following is a full, clear, and exact description thereof, which will enable others skilled in the art to which it pertains to make and use the same, reference being had to the accompanying drawings, and to the letters of reference marked thereon, which form a part of this specification, in which drawings—

Figure 1:
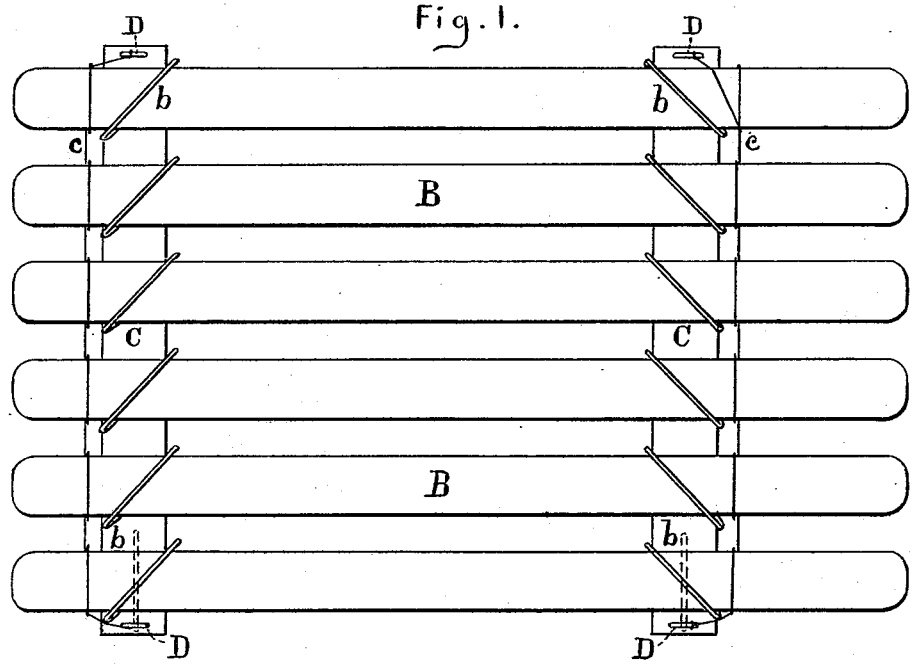
Figure 2:
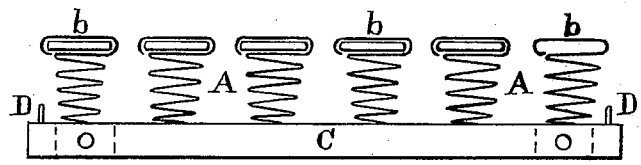

Figure 1 is a top view. Fig. 2 is an end view with one slat removed, showing the slat-loop.

My invention relates to spring bed-bottoms; and consists of spiral springs made with slat-loops of proper size and shape at the top of the springs to receive the slats, and adjusted so that the slats are clamped and securely held in place by the pressure of the springs, as hereinafter described.

A represents the springs, provided with slat-loops $b$. B represents the slats, and C the bars supporting the springs. D represents rings or staples for attaching the ends of the cords $c$, looped around the slats to hold them in position laterally. The springs arranged in transverse rows are adjusted on and fastened to the bars C, so that the loops are in oblique positions to the slats, and are reversely arranged with relation to each other, as shown in Fig. 1 of the drawings.

To introduce the slats, the loops are placed at right angles to the slats, as shown in dotted lines in the drawings, and when properly adjusted the slats are clamped and held in place by the wires of the loops, which, by the force of the springs, are pressed against the edges of the slats.

The loops of each slat being reversely arranged in relation to each other, as described and shown, a lengthwise movement of a slat which tends to loosen one loop tightens the other loop, and thus their holding capacity is increased, and the slats thus adjusted and held are not liable to be moved out of place in handling or moving the bed-bottom.

What I claim as new, and desire to secure by Letters Patent, is—

The slat-loops $b$ on spiral springs A, arranged obliquely to the slats and reversely to each other, in combination with slats B, substantially as and for the purpose described.

In testimony that I claim the foregoing as my own invention I affix my signature in presence of two witnesses.

JESSE A. JONES.

Witnesses:
C. M. JORDAN,
E. C. BRANSON.